United States Patent
Yang et al.

(10) Patent No.: US 7,532,319 B2
(45) Date of Patent: May 12, 2009

(54) APPARATUS FOR CALIBRATING DISPLACEMENT OF REFLECTIVE PARTS IN DIFFRACTIVE OPTICAL MODULATOR

(75) Inventors: Haeng Seok Yang, Bucheon-si (KR); Sang Kyeong Yun, Suwon (KR); Seung Do An, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/043,870

(22) Filed: Mar. 6, 2008

(65) Prior Publication Data

US 2008/0218837 A1   Sep. 11, 2008

(30) Foreign Application Priority Data

Mar. 8, 2007   (KR)   .................. 10-2007-0023102

(51) Int. Cl.
*G01J 1/10* (2006.01)
*G01J 1/42* (2006.01)

(52) U.S. Cl. .................................. 356/243.1; 356/228

(58) Field of Classification Search ... 356/237.1–241.6, 356/243.1–243.8, 426–431, 600–640
See application file for complete search history.

(56) References Cited

U.S. PATENT DOCUMENTS

| 6,462,818 B1 * | 10/2002 | Bareket ...................... 356/401 |
| 7,298,481 B2 * | 11/2007 | Mieher et al. ............... 356/401 |
| 7,388,181 B2 * | 6/2008 | Han et al. .................... 250/205 |

* cited by examiner

*Primary Examiner*—L. G. Lauchman
*Assistant Examiner*—Jarreas C Underwood
(74) *Attorney, Agent, or Firm*—Christensen O'Connor Johnson Kindness PLLC

(57) ABSTRACT

Disclosed herein is an apparatus for calibrating the displacement of reflective parts in a diffractive optical modulator. The apparatus includes a diffractive optical modulator, a light intensity measurement unit, a projection unit, and display electronics. The light intensity measurement unit is disposed near one side of the diffractive optical modulator and measures and outputs the intensity of incident linear diffracted light having a predetermined diffraction order.

6 Claims, 3 Drawing Sheets

US 7,532,319 B2

APPARATUS FOR CALIBRATING DISPLACEMENT OF REFLECTIVE PARTS IN DIFFRACTIVE OPTICAL MODULATOR

CROSS REFERENCE TO RELATED APPLICATION

This application claims the benefit of Korean Patent Application No. 10-2007-0023102, filed on Mar. 8, 2007, entitled "Calibration Apparatus for the Displacement of the Reflective Part in the Diffractive optical modulator," which is hereby incorporated by reference in its entirety into this application.

BACKGROUND OF THE INVENTION

1. Field of the Invention

The present invention relates generally to an apparatus for calibrating the displacement of reflective parts in a diffractive optical modulator, and, more particularly, to an apparatus for calibrating the displacement of reflective parts in a diffractive optical modulator, which is capable of measuring variation in the displacement of upper reflective parts using a portion of diffracted light having a plurality of diffraction orders and then compensating for the measured variation in the displacement of the upper reflective parts.

2. Description of the Related Art

Active research into various Flat Panel Displays (FPDs) has been conducted in order to develop next generation display devices. Of them, generalized FPDs include Liquid Crystal Displays (LCDs) using the electro-optic characteristics of liquid crystal, and Plasma Display Panels (PDPs) using gas discharge.

LCDs are disadvantageous in that the viewing angle thereof is narrow, the response speed thereof is slow, and the manufacturing process thereof is complicated because Thin Film Transistors (TFTs) and electrodes must be formed using a semiconductor manufacturing process.

In contrast, PDPs are advantageous in that the manufacturing process thereof is simple, and is thus suitable for the implementation of large-sized screens, but are disadvantageous in that the power consumption thereof is high, the discharge and light emission efficiency thereof are low, and the price thereof is high.

New types of display devices capable of overcoming the disadvantages of the above-described FPDs have been developed. Recently, there has been proposed a display device that can display images through micro Spatial Light Modulators (SLMs), which are formed for respective pixels using Micro Electromechanical Systems (hereinafter referred to as "MEMSs"), which are based on an ultra-micro machining technology.

SLMs are converters that are configured to modulate incident light into a spatial pattern corresponding to an electrical or optical input. The incident light may be modulated in phase, intensity, polarization or direction. Optical modulation can be achieved using several materials that have several electro-optic or magneto-optic effects or material that modulates light through surface deformation.

FIG. 1 is a perspective view of a prior art open hole-based diffractive optical modulator.

Referring to the drawing, the prior art open hole-based diffractive optical modulator includes a substrate 101.

The open hole-based diffractive optical modulator further includes an insulating layer 102 that is formed on the substrate 101.

The open hole-based diffractive optical modulator further includes a lower reflective part 103 that is formed on part of the insulating layer 102 and is configured to reflect incident light that passes through the holes 106aa to 106nb of upper reflective parts 106a to 106n and the spaces between the upper reflective parts 106a to 106n.

The open hole-based diffractive optical modulator further includes a pair of side support members 104 and 104' that allow the lower reflective part 103 to be interposed therebetween, and are formed on the surface of the substrate 101 to be spaced apart from each other.

The open hole-based diffractive optical modulator further includes a plurality of laminate support plates 105a to 105n that have side portions supported by the pair of side support members 104 and 104', are spaced apart from the substrate 101, have central portions movable upward and downward, have holes (not shown) corresponding to the holes 106aa to 106nb formed in the upper reflective parts 106a to 106n at the central portions thereof, and constitute an array.

The open hole-based diffractive optical modulator further includes the upper reflective parts 106a to 106n that are respectively formed at the central portions of the laminate support plates 105a to 105n, have the holes 106aa to 106nb at the centers thereof, so that they reflect some incident light and allow the remaining incident light to pass through the holes 106aa to 106nb, and constitute an array.

The open hole-based diffractive optical modulator further includes a plurality of pairs of piezoelectric layers 110a to 110n and 110a' to 110n' that are formed over the laminate support plates 106a to 106n, are spaced apart from each other, are placed over the side support members 104 and 104', and are configured to move the laminate support plates 106a to 106n upward and downward.

In the piezoelectric layers 110a to 110n and 110a' to 110n', when voltage is applied to the lower electrode layers 110aa to 110na and 110aa' to 110na', the piezoelectric material layers 110ab to 110nb and 110ab to 110nb' and the upper electrode layers 110ac to 110nc and 110ac' to 110nc, the central portions of the laminate support plates 105a to 105n move upward and downward due to the contraction and expansion of the piezoelectric material layers 110ab to 110nb and 110ab' to 110nb'. Accordingly, the upper reflective parts 106a to 106n move upward and downward.

Meanwhile, when light is incident on the upper reflective parts 106a to 106n of the open hole-based diffractive optical modulator, the upper reflective parts 106a to 106n reflect part of the incident light and allow the remaining part of the incident light to pass through the holes 106aa to 106nb, and the lower reflective part 103 reflects light that has passed through the holes 106aa to 106nb of the upper reflective parts 106a to 106n.

As a result, the light reflected from the upper reflective parts 106a to 106n and the light reflected from the lower reflective part 103 forms diffracted light having several diffraction orders. The intensity of the diffracted light is highest when the difference in height between the upper reflective parts 106a to 106n and the lower reflective part 103 is an odd multiple of $\lambda/4$ where $\lambda$ is the wavelength of the incident light, and is lowest when the difference in height between the upper reflective parts 106a to 106n and the lower reflective part 103 is an even multiple of $\lambda/4$.

FIG. 2 is a partial sectional view of the open hole-based diffractive optical modulator, which is taken along line A-A' of FIG. 1 and shows the sections of first and second upper reflective parts 106a and 106b.

In FIG. 2, when the interval between the upper reflective parts 106a and 106b and the lower reflective part 103 is configured to be a first interval $$\frac{\lambda}{4} + \frac{n\lambda}{2}$$

(where λ is the wavelength of incident light and n is an integer), the intensity of light is lowest.

Furthermore, when the interval between the upper reflective parts 106a and 106b and the lower reflective part 103 is a second interval $$\frac{n\lambda}{2}$$

(where λ is the wavelength of incident light and n is an integer), the intensity of light is highest.

Meanwhile, in order to obtain the highest intensity of light, the first upper reflective part 106a, indicated by solid lines, must be displaced by $I_1$ or $L_1$, while the second upper reflective part 106b, indicated by solid lines, must be displaced by $I_2$ or $L_2$.

However, there are many cases where the upper reflective parts 106a and 106b are located not at initial positions, indicated by solid lines, but at positions indicated by dotted lines, after the passage of time, due to frequent upward and downward movement even when voltage is not applied to the piezoelectric layers 110a, 110a', 110b and 110b'. In this case, in order to obtain the lowest intensity of light or the highest intensity of light, the first reflective part 106a must be displaced by $I_1'$ or $L_1'$, while the second reflective part 106b must be displaced by $I_2'$ or $L_2'$.

As a result, there is variation in the displacement of the upper reflective parts 106a to 106n, which are required to represent the lowest intensity of light or the highest intensity of light. Only when the variation in the displacement is compensated for can the desired accurate lowest intensity of light or the desired accurate highest intensity of light be obtained.

SUMMARY OF THE INVENTION

Accordingly, the present invention has been made keeping in mind the above problems occurring in the prior art, and is intended to provide an apparatus for calibrating the displacement of reflective parts in a diffractive optical modulator, which is capable of measuring variation in the displacement of upper reflective parts using a portion of diffracted light having a plurality of diffraction orders and then compensating for the measured variation in the displacement of the upper reflective parts.

In order to accomplish the above object, the present invention provides an apparatus for calibrating the displacement of reflective parts in a diffractive optical modulator, including a diffractive optical modulator for, when test voltage is applied thereto, diffracting incident light based on the applied test voltage and emitting linear diffracted light having a plurality of diffraction orders; a light intensity measurement unit disposed near one side of the diffractive optical modulator and configured to measure and output intensity of incident linear diffracted light having a predetermined diffraction order; a projection unit for causing diffracted light having a first predetermined diffraction order, which belongs to the diffracted light having a plurality of diffraction orders, which is emitted from the diffractive optical modulator, to enter the light intensity measurement unit, and directing diffracted light having a second predetermined diffraction to a screen; and display electronics for applying the test voltage to the diffractive optical modulator, calculating calibration voltage by comparing the intensity of light that is measured by the light intensity measurement unit with intensity of light that is expected to be measured for the diffracted light having a first predetermined diffraction order when the test voltage is applied to the diffractive optical modulator, and determining subsequent driving voltage based on the calibration voltage.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
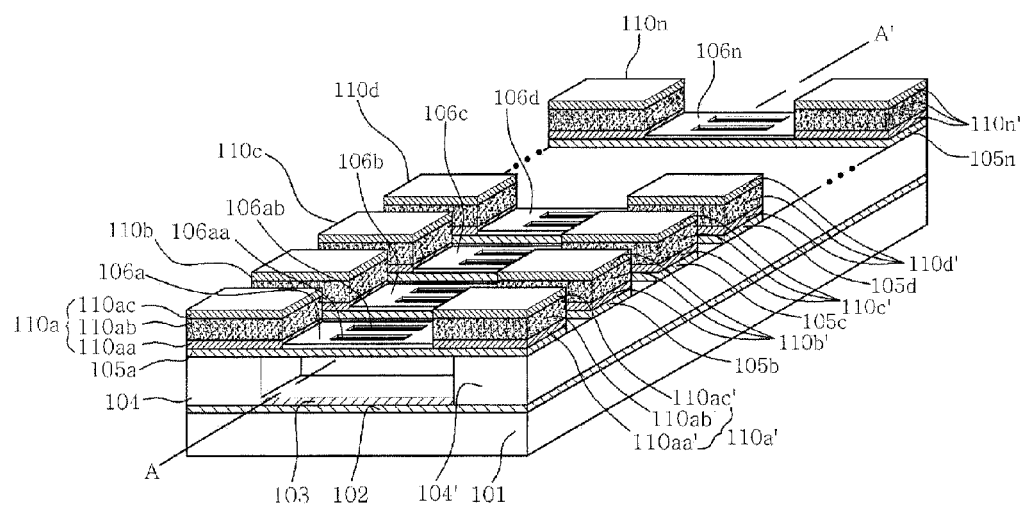
FIG. 1 is a perspective view of a prior art open hole-based diffractive optical modulator.

Reference now should be made to the drawings, in which the same reference numerals are used throughout the different drawings to designate the same or similar components.

An apparatus for calibrating the displacement of reflective parts in a diffractive optical modulator according to a preferred embodiment of the present invention will now be described in detail with reference to FIGS. 3 to 5B.

Figure 3:
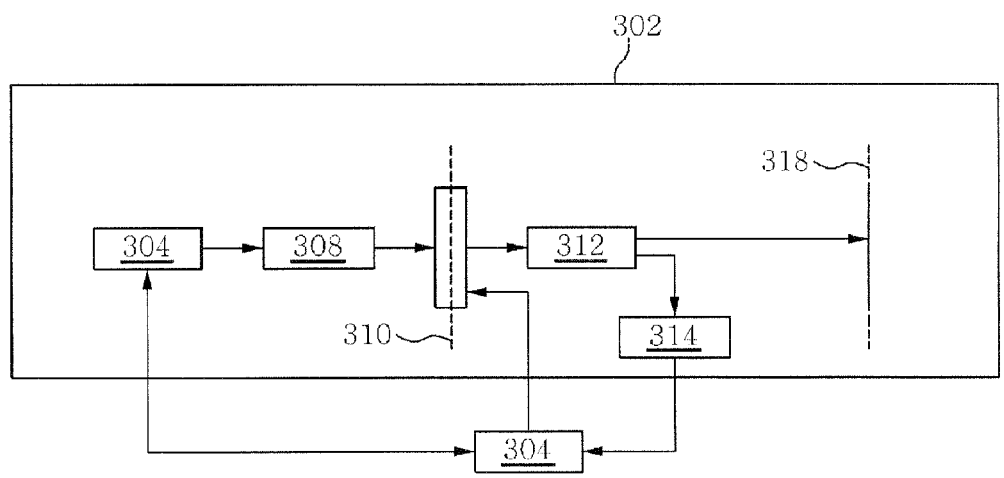
FIG. 3 is a diagram showing the construction of a display device using a diffractive optical modulator to which an apparatus for calibrating the displacement of reflective parts in a diffractive optical modulator according to an embodiment of the present invention is applied.

FIG. 3 is a block diagram showing the construction of a display device using a diffractive optical modulator, to which the apparatus for calibrating the displacement of reflective parts is applied, according to an embodiment of the present invention.

Referring to FIG. 3, the display device using a diffractive optical modulator, to which the apparatus for calibrating the displacement of reflecting parts in the diffractive optical modulator according to the embodiment of the present invention is applied, includes display optics 302 and display electronics 304.

The display optics 302 include a light source unit 306, which generates light and emits the generated light. A light source, formed of a semiconductor, such as a Vertical External Cavity Surface Emitting Laser (VECSEL), a Vertical Cavity Surface Emitting Laser (VCSEL), a Light Emitting Diode (LED), a Laser Diode (LD), or a Super Luminescent Diode (SLED), may be used as each light source of the light source unit 306.

The light source unit 306 emits laser light. The cross-section of the laser light is circular, and the intensity profile of the laser light has a Gaussian distribution. For example, the light source unit 306 (in practice, it is formed of a Red (R)

laser, a Green (G) laser and a Blue (B) laser) may be configured to sequentially emit R light, G light and B light.

The display optics 302 further include an illumination unit 308, which radiates light emitted from the light source unit 306 onto the diffractive optical modulator 310 in the form of linear parallel light.

The illumination unit 308 converts the laser light, emitted from the light source 306, into light having a long length and a narrow width, converts the linear light into parallel light, and causes the parallel light to enter the diffractive optical modulator 310.

The illumination unit 308 may be formed of, for example, a convex lens (not shown), or a combination of a convex lens (not shown) and a collimating lens (not shown).

The display optics 302 include a diffractive optical modulator 310, which produces diffracted light having a plurality of diffraction orders, the intensity of which is adjusted, by diffracting the linear light emitted from the illumination optical unit 308.

Here, the diffracted light emitted from the diffractive optical modulator 310 includes diffracted light having a plurality of diffraction orders, such as 0th-order diffracted light, ±1st-order diffracted light, ±2nd-order diffracted light, ±3rd-order diffracted light and the like. Odd-order diffracted light and even-order diffracted light have a phase difference of 180° therebetween.

Accordingly, the intensity of diffracted light having an even diffraction order is lowest if the intensity of diffracted light having an odd diffraction order is highest, while the intensity of diffracted light having an even diffraction order is highest if the intensity of diffracted light having an odd diffraction order is lowest.

Meanwhile, the intensities of light having a plurality of diffraction orders are correlated with each other. The intensity of the remaining even-order diffracted light is highest if the intensity of 0th-order diffracted light is highest, while the intensity of the remaining even-order diffracted light is lowest if the intensity of 0th-order diffracted light is lowest. That is, the relative intensities of a plurality of beams of even-order diffracted light are the same.

The diffracted light emitted from the diffractive optical modulator 310 is linear, long, narrow diffracted light.

Furthermore, the intensity of the remaining odd-order diffracted light is highest if the intensity of ±1st-order diffracted light is highest, while the intensity of the remaining odd-order diffracted light is lowest if the intensity of ±1st-order diffracted light is lowest. That is, the relative intensities of a plurality of beams of odd-order diffracted light are the same. The diffracted light emitted from the diffractive optical modulator 310 may be configured such that diffracted light produced by a single upper reflecting part and its corresponding lower reflecting part forms a diffracted light corresponding to one pixel of an image formed on a screen 318, or such that diffracted light produced by two or more upper reflecting parts and their corresponding lower reflecting parts forms diffracted light corresponding to one pixel of an image formed on the screen 318.

Furthermore, the display optics 302 include a projection unit 312 for forming images by projecting 0th-order diffracted light, which belongs to diffracted light having a plurality of diffraction orders emitted from the diffractive optical modulator 310, onto the screen 318, and directs ±1st-order diffracted light to the light intensity measurement unit 314.

Figure 4:
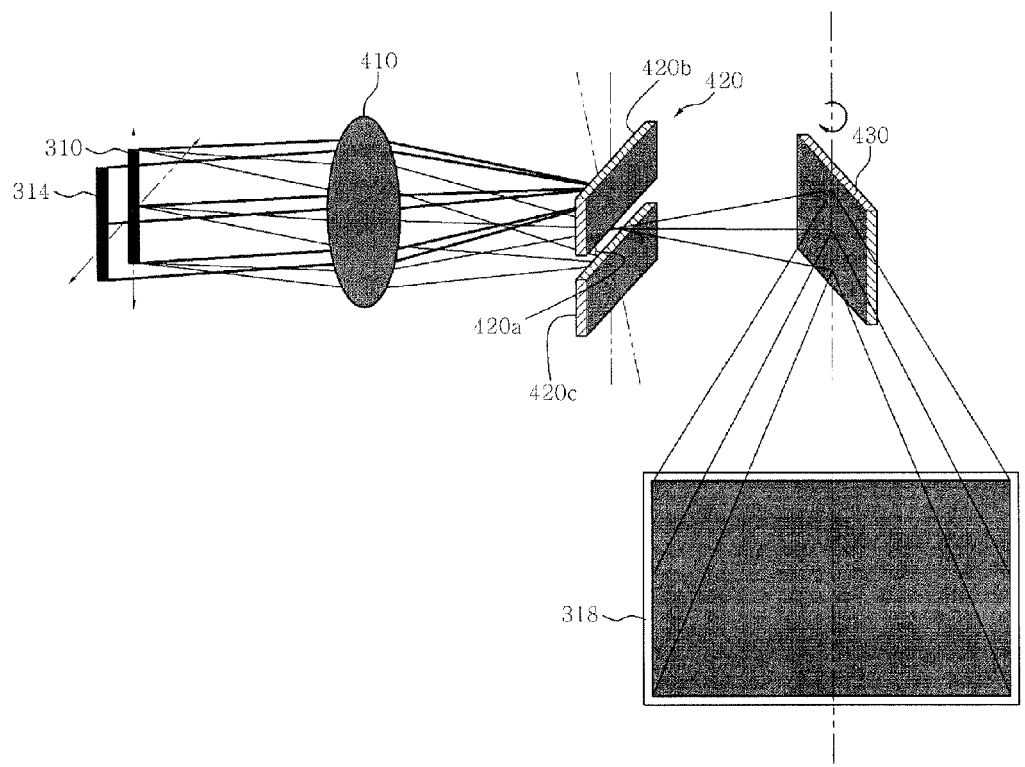
FIG. 4 is a diagram showing the construction of the apparatus for calibrating the displacement of reflective parts in a diffractive optical modulator according to the embodiment of the present invention.

An example of the projection unit 312 is shown in FIG. 4. The projection unit 312 includes a projection lens 410, a filter 420, and a scanner 430.

Here, the projection lens 410 projects diffracted light, having a plurality of diffraction orders, emitted from the diffractive optical modulator 310, to be focused on the screen 318, and directs diffracted light having a specific diffraction order, reflected from the filter 420, to the light intensity measurement unit 314.

The filter 420 passes 0th-order diffracted light therethrough to the scanner 430, and reflects ±1st-order diffracted light, so that the ±1st-order diffracted light is directed to the light intensity measurement unit 314 through the projection lens 410.

The filter 420 may be a dichroic filter or a spatial filter. In FIG. 4, a spatial filter 420 is shown.

The spatial filter 420, shown in FIG. 4, includes a slit 420a for passing 0th-order diffracted light therethrough, an upper reflective part 420b for reflecting ±1st-order diffracted light, and a lower reflective part 420c for reflecting −1st-order diffracted light.

The spatial filter 420 is slightly inclined, such that ±1st-order diffracted light can reach the light intensity measurement unit 314 disposed on one side of the diffractive optical modulator 310.

Figure 5A:
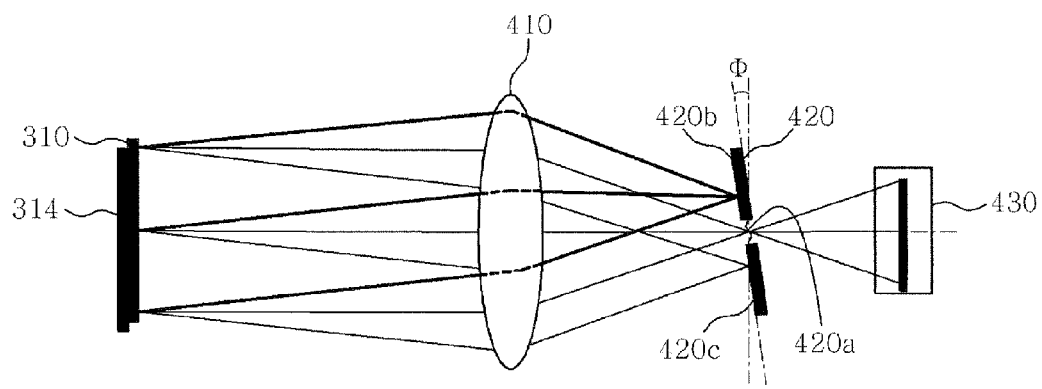
FIG. 5A is a side view of FIG. 4.
Figure 5B:
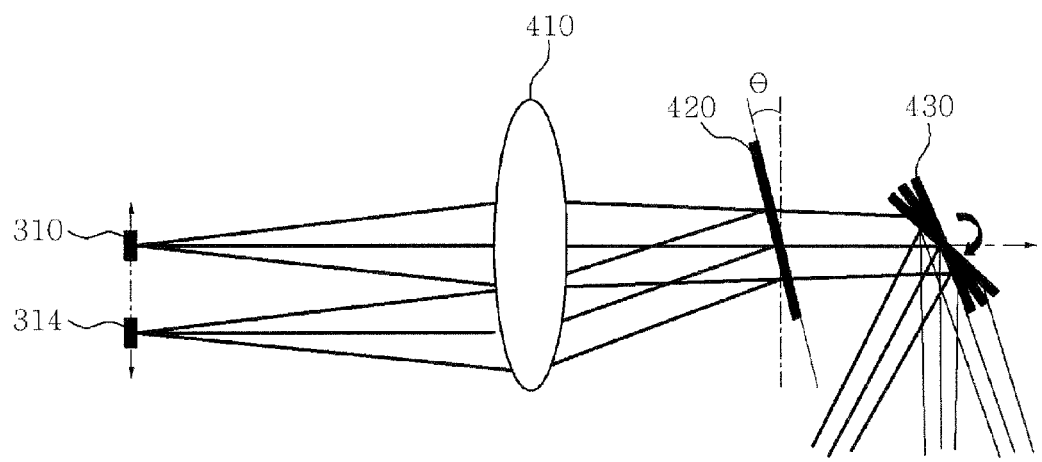
FIG. 5B is a plan view of FIG. 4.

That is, as shown in FIG. 5A, the spatial filter 420 is downwardly inclined at an angle of φ when seen from the side and is inclined at an angle θ when seen from above, so that the light path of reflected light extends to the light intensity measurement unit 314.

The scanner 430 of the projection unit 312 may be a Galvanometer mirror scanner or a polygon mirror scanner. The Galvanometer scanner has a square plate shape, and is provided with a mirror on one surface thereof. The Galvanometer scanner laterally rotates within a predetermined angular range around one axis thereof. The polygon mirror scanner has a polygonal column shape, and is provided with mirrors on the side surfaces thereof. The polygon mirror scanner projects images onto the screen 318 by varying the reflection angle of incident light using the mirrors attached to the sides thereof while rotating in one direction around one axis thereof.

Meanwhile, the light intensity measurement unit 314 measures and outputs the intensity of diffracted light reflected from the reflective parts 420b and 420c of the filter 420 of the diffractive projection unit 312. Although a single photodiode is used, it is preferable to use a photodiode array.

When the photodiode array is used as described above, 1) the use of the photodiode array can reduce the Signal-to-Noise Ratio (SNR) compared to the case in which the single photodiode is used, and 2) the photodiode can calibrate the displacement of the reflective parts faster than the single photodiode.

In this case, the reason why the SNR is improved is that, assuming that the size of a pixel of the diffractive optical modulator 310 is S, the size of a pixel of the photodiode array is C, and the number of pixels of the diffractive optical modulator is M, $SN=(S/C)*M$, so that, in the case of the single pixel, C is 1, and thus $SN=S*M$ and is fixed, while, in the case of the photodiode array, the SNR can be reduced by adjusting the value of C.

Meanwhile, the reason why the speed of the calibration of the displacement of the reflective parts is increased is that, in the case of the use of the single photodiode, the calibration of the displacement of the reflective parts is performed on all pixels of the diffractive optical modulator using the single photodiode, while, in the case of the use of the photodiode array, each unit photodiode of the photodiode array corresponds to a plurality of pixels, and the unit photodiode performs the calibration of the displacement of the reflective parts only on a corresponding number of pixels, thereby increasing the speed of calibration correspondingly.

Meanwhile, the display electronics 304 are connected to the light source unit 306, the diffractive light modulator 310, the projection unit 312, and the display electronics 314. The display electronics 304 provide power to the light source unit 306. Meanwhile, the display electronics 304 operate the upper reflective parts by supplying driving voltage to the upper and lower electrode layers of the piezoelectric layers of the diffractive optical modulator 310. In this case, the display electronics 304 increase or decrease driving voltage supplied to the upper and lower electrode layers with reference to the intensity of light measured by the light intensity measurement unit 314.

That is, the display electronics 304 determine that there is variation in the displacement of the upper reflective parts of the diffractive optical modulator 310 if the actually measured intensity of light is lower than the intensity of light that is expected to be measured when designated driving voltage is applied to the upper and lower electrode layers of the piezoelectric layers of the diffractive optical modulator 310.

Figure 2:
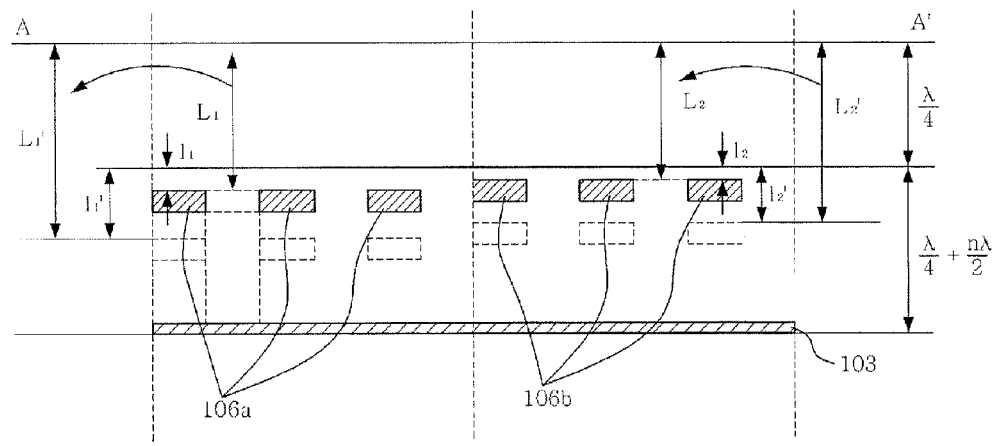
FIG. 2 is a partial sectional view taken along line A-A' of FIG. 1, showing the sections of first and second upper reflective parts.

Meanwhile, the display electronics 304 need to move the upper reflective parts a longer distance, as shown in FIG. 2, in order to compensate for the variation in the displacement of the reflective parts. In turn, in order to move the upper reflective parts a longer distance, higher driving voltage is required. Accordingly, the display electronics 304 calibrate the displacement of the upper reflective parts by compensating for the shortage of the driving voltage.

According to the above-described present invention, there is an effect of measuring variation in the displacement of the upper reflective parts of the diffractive optical modulator and easily calibrating driving voltage based on the measured variation.

Furthermore, according to the present invention, the displacement of the upper reflective parts can be measured by reflecting light having a specific diffraction order using a filter without requiring an additional optical structure, so that there is an advantage in that a small size can be realized.

Furthermore, according to the present invention, the light intensity measurement unit can be disposed near one side of the diffractive optical modulator, so that there is an advantage in that a small size can be realized.

Furthermore, according to the present invention, a small size can be realized because no additional optical structure is required, so that there is an effect in that the diffractive optical modulator of the present invention can be easily used in small-sized terminals.

Furthermore, according to the present invention, intensity of light sufficient to calibrate the displacement of the reflective parts can be acquired because all of the ±1st-order diffracted light is used, so that there is an effect in that the desired accuracy of the displacement of the reflective parts can be realized.

Furthermore, according to the present invention, desired accuracy can be ensured even when the intensity of light emitted from the diffractive optical modulator is reduced during the calibration of the displacement of the reflective parts because all of the ±1st-order diffracted light is used, so that there is an effect in that the creation of unnecessary images on the screen can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for calibrating displacement of reflective parts in a diffractive optical modulator, comprising:
    a diffractive optical modulator for, when test voltage is applied thereto, diffracting incident light based on the applied test voltage and emitting linear diffracted light having a plurality of diffraction orders;
    a light intensity measurement unit disposed near one side of the diffractive optical modulator and configured to measure and output intensity of incident linear diffracted light having a predetermined diffraction order;
    a projection unit for causing diffracted light having a first predetermined diffraction order, which belongs to the diffracted light having a plurality of diffraction orders, emitted from the diffractive optical modulator, to enter the light intensity measurement unit, and directing diffracted light having a second predetermined diffraction to a screen; and
    display electronics for applying the test voltage to the diffractive optical modulator, calculating calibration voltage by comparing the intensity of light that is measured by the light intensity measurement unit with intensity of light that is expected to be measured for the diffracted light having a first predetermined diffraction order when the test voltage is applied to the diffractive optical modulator, and determining subsequent driving voltage based on the calibration voltage.

2. The apparatus for calibrating displacement of reflective parts as set forth in claim 1, wherein the light intensity measurement unit is a photodiode array that is configured such that each unit photodiode corresponds to a predetermined number of pixels of the diffractive optical modulator.

3. The apparatus for calibrating displacement of reflective parts as set forth in claim 1, wherein the projection unit comprises a filter that has reflective surfaces and thus reflects the diffracted light having a first predetermined diffraction order toward the light intensity measurement unit, and that passes the diffracted light having a second predetermined diffraction order, emitted from the diffractive optical modulator, therethrough.

4. The apparatus for calibrating displacement of reflective parts as set forth in claim 1, wherein the projection unit comprises:
    a projection lens for magnifying the diffracted light emitted from the diffractive optical modulator;
    a filter configured to have reflective surfaces and thus reflect the diffracted light having a first predetermined diffraction order toward the light intensity measurement unit, and to pass the diffracted light having a second predetermined diffraction order, emitted from the diffractive optical modulator, therethrough; and
    a scanner for forming images by scanning the diffracted light having a second predetermined diffraction order, passed through the filter, across the screen.

5. The apparatus for calibrating displacement of reflective parts as set forth in claim 3, wherein the diffracted light having a first predetermined diffraction order, reflected from the filter, is ±1st-order diffracted light, and the diffracted light having a second diffraction order is 0th-order diffracted light.

6. The apparatus for calibrating displacement of reflective parts as set forth in claim 2, wherein the photodiode array is disposed on one side of and parallel to the diffractive optical modulator.

* * * * *